(12) United States Patent
Steffen et al.

(10) Patent No.: US 8,668,182 B2
(45) Date of Patent: Mar. 11, 2014

(54) HOLDING DEVICE FOR FASTENING A LASER INSTRUMENT

(75) Inventors: Roman Steffen, Rebstein (CH); Christian Haefele, Feldkirch (AT)

(73) Assignee: Hilti Aktiengesellschaft, Schann (LI)

( * ) Notice: Subject to any disclaimer, the term of this patent is extended or adjusted under 35 U.S.C. 154(b) by 18 days.

(21) Appl. No.: 12/770,495

(22) Filed: Apr. 29, 2010

(65) Prior Publication Data

US 2010/0276555 A1 Nov. 4, 2010

(30) Foreign Application Priority Data

Apr. 30, 2009 (DE) .......................... 10 2009 002 756

(51) Int. Cl.
*F16M 11/00* (2006.01)

(52) U.S. Cl.
USPC ........... 248/689; 248/558; 248/645; 248/911; 22/286

(58) Field of Classification Search
USPC ........ 248/689, 558, 645, 205.1, 206.5, 274.1, 248/911; 33/299, 286
See application file for complete search history.

(56) References Cited

U.S. PATENT DOCUMENTS

| | | | | |
|---|---|---|---|---|
| 2,099,159 A | * | 8/1959 | Mattox | 248/229.15 |
| 5,495,675 A | * | 3/1996 | Huang | 42/115 |
| 6,209,834 B1 | * | 4/2001 | Stonehouse | 248/274.1 |
| 6,256,895 B1 | * | 7/2001 | Akers | 33/286 |
| 6,438,854 B1 | * | 8/2002 | Kott, Jr. | 33/286 |
| 6,470,579 B2 | * | 10/2002 | Allen | 33/286 |
| 6,826,841 B2 | * | 12/2004 | Liao | 33/286 |
| 6,922,901 B1 | * | 8/2005 | Chou et al. | 33/290 |
| 7,328,516 B2 | * | 2/2008 | Nash et al. | 33/286 |
| 7,611,105 B1 | * | 11/2009 | Carazo | 248/187.1 |
| 7,631,434 B1 | * | 12/2009 | Carter, Jr. | 33/293 |
| 7,685,723 B2 | * | 3/2010 | Kallabis | 33/286 |
| 2003/0014872 A1 | * | 1/2003 | Chen | 33/286 |
| 2005/0172502 A1 | * | 8/2005 | Sergyeyenko et al. | 33/286 |
| 2010/0122466 A1 | * | 5/2010 | Hemingway et al. | 33/228 |
| 2010/0187392 A1 | * | 7/2010 | Berger et al. | 248/231.41 |

FOREIGN PATENT DOCUMENTS

DE 203 04 117 U1 6/2003
DE 10 2007 019 610 A1 10/2008

OTHER PUBLICATIONS

German Search Report, dated Oct. 30, 2009, 2 pages.

* cited by examiner

*Primary Examiner* — Bradley Duckworth
(74) *Attorney, Agent, or Firm* — Crowell & Moring LLP

(57) ABSTRACT

A holding device for fastening a laser instrument, in particular to a magnetic construction, a pipe, a wall rail and/or ceiling rail, and/or a wall, is disclosed. The holding device includes a basic frame, a receptacle device connected to the basic frame to accommodate the laser instrument and a fastening apparatus connected to the basic frame with a first fastening device. The first fastening device is configured to be rotatable around an axis of rotation relative to the basic frame from a first position into a second position.

12 Claims, 2 Drawing Sheets

The present invention relates to a holding device for fastening a laser instrument, in particular to a magnetic construction, a pipe, a wall rail or ceiling rail, and/or a wall, comprised of a basic frame, a receptacle device connected to the basic frame to accommodate the laser instrument and a fastening apparatus connected to the basic frame, wherein the fastening apparatus has a first fastening device.

HOLDING DEVICE FOR FASTENING A LASER INSTRUMENT

This application claims the priority of German Patent Document No. 10 2009 002 756.4, filed Apr. 30, 2009, the disclosure of which is expressly incorporated by reference herein.

BACKGROUND AND SUMMARY OF THE INVENTION

The present invention relates to a holding device for fastening a laser instrument, in particular to a magnetic construction, a pipe, a wall rail or ceiling rail, and/or a wall, comprised of a basic frame, a receptacle device connected to the basic frame to accommodate the laser instrument and a fastening apparatus connected to the basic frame, wherein the fastening apparatus has a first fastening device.

Laser instruments that generate point-shaped and/or line-shaped laser beams are known for performing leveling or marking work in interior and exterior construction. These laser beams are used to transfer reference points and reference lines onto walls, ceilings and/or floors. A distinction is made in terms of these laser instruments between rotating lasers and point and/or line lasers. Rotating lasers generate a line-shaped laser beam by rotating a laser beam source or beam-deflecting optics around a rotational axis. Point and/or line lasers generate laser beams through beam-forming optics such as cylindrical lenses or prisms. Point and/or line lasers are frequently configured to be self-leveling in a limited angular range. To this end, the beam unit is suspended for example on a pendulum device. The beam device aligns with the plumb line itself within the self-leveling range in the earth's gravitational field independent of an alignment of the laser instrument so that the laser beams are precisely aligned in the horizontal or vertical direction.

Projecting a point-shaped or line-shaped laser beam at a specific height on a wall requires that the laser instrument be arranged at the appropriate height. Various holding devices are known from the prior art that can be used to fasten a laser instrument to a wall, a wall rail or ceiling rail, to a pipe and/or a magnetic construction.

German Patent Document No. DE 203 04 117 U1 discloses a laser instrument that is attached to a wall by means of a holding device. The holding device is arranged in an opening of the laser instrument so that it is removable. The holding device is comprised of a basic element, a magnet attached to the basic element and a ramp. The basic element can cooperate with a fastening device, for example a wall assembly, a pin assembly or a bolt assembly. The fastening devices are each comprised of a magnetic plate, which is held together with the basic element via the magnet.

The Applicant offers various accessory parts for its laser instruments for fastening the laser instrument to different substrates, for example, to a wall, a wall rail or ceiling rail, a pipe and/or a magnetic construction. Included among these are a pipe adapter PMA 70, a wall bracket PMA 71, a magnet bracket PMA 74, a dry wall adapter PMA 75 and a ceiling clamp PMA 76. The wall bracket PMA 71 is comprised of a basic frame, a height-adjustable receptacle device connected to the basic frame to accommodate the laser instrument and a wall mounting device connected to the basic frame. To fasten the laser instrument to a pipe, the pipe adapter PMA 70 is connected to the wall bracket PMA 71. Once the wall bracket is connected to the pipe adapter PMA 70, it is only possible to fasten the laser instrument to a pipe via the pipe adapter, fastening it by means of the wall mounting device is not possible. The magnet bracket PMA 74 is comprised of a basic frame, a receptacle device connected to the basic frame and a magnetic holding element connected to the basic frame. The ceiling clamp PMA 76 is comprised of a basic frame, a height-adjustable receptacle device connected to the basic frame and a rail mounting device connected to the basic frame, which rail mounting device is comprised of a height-adjustable lower bearing element and an eccentric to clamp the rail between the lower bearing element and a fixed upper bearing element.

In addition, a holding device is also known that is comprised of a basic frame, a height-adjustable receptacle device connected to the basic frame to accommodate the laser instrument and a holding device connected to the basic frame, which holding device has a wall mounting device on the upper end of the basic frame, a magnetic adapter on the rear side of the basic frame and a tripod adapter or pedestal on the underside. The disadvantage is that the holding device does not permit fastening to a pipe and a wall rail or ceiling rail.

In addition, a holding device for fastening a laser instrument to a wall, a magnetic construction and a pipe is known. The holding device is comprised of a basic frame, a receptacle device arranged on the upper side of the basic frame and connected to the basic frame, and a holding device connected to the basic frame. The holding device has a magnetic adapter on the rear side and underside, and screw holes on a lateral surface as a wall mounting device. It also has a horizontal and a vertical belt guide, through which a commercially available belt can be pulled to fasten the holding device to a pipe. The holding device abuts the pipe with the horizontal belt guide on the underside and with the vertical belt guide on the rear side of the holding device. The disadvantage is that the holding device abuts the pipe with the magnetic adapter, which produces a small contact surface, above all in the case of cylindrical pipes. In addition, the holding device does not permit fastening to a wall rail or ceiling rail.

The objective of the present invention on the other hand is to simplify the fastening of the laser instrument to various substrates and make a compact holding device available to the user that permits the laser instrument to be securely fastened to several types of fasteners.

This objective is attained with the holding device according to the present invention in that the first fastening device is configured to be rotatable around an axis of rotation relative to the basic frame from a first position into a second position. The advantage of a rotatable fastening device is that the laser instrument can be fastened in the first and second positions on various substrates. It is not necessary to assemble individual parts in order to fasten the holding device to a magnetic construction, for example, or to a pipe. On the other hand, fastening can be adapted to the substrate, such as a pipe, for example.

In a preferred embodiment, the fastening apparatus has a second fastening device connected to the basic frame, wherein the second fastening device is configured to be rotatable around an axis of rotation relative to the basic frame from a first position into a second position. The second fastening device, which like the first fastening device is configured to be adjustable from a first position into a second position, increases the reliability of the fastening to the substrate.

It is especially preferred that the first fastening device and/or the second fastening device are configured to be rotatable around the axis of rotation relative to the basic frame from the first position or the second position into a third position. A fastening device that is configured to be rotatable into three positions makes it possible to fasten the holding device to three different substrates, for example to a magnetic construction, a pipe and to a wall rail or ceiling rail, wherein the fastening device can be adapted to the different substrates in order to guarantee secure fastening.

In another preferred embodiment, the first fastening device and/or the second fastening device have a magnetic holding element and a pipe adapter, wherein the holding device is fastened in the first position via the magnetic holding element and in the second position via the pipe adapter.

The first fastening device and/or the second fastening device are preferably configured to be adjustable in a vertical direction relative to the basic frame by an adjusting device. The adjusting device can be used to adjust the vertical distance between the fastening devices and adapt to different local conditions. The greater the distance between the fastening devices, the more stable is the fastening to the substrate. On the other hand, the adjusting device also permits fastening to short pipes or a narrow rail.

In another preferred embodiment, the first fastening device and/or the second fastening device have a wall mounting device and/or a rail mounting device. It is especially preferred that the holding device is fastened in the third position via the wall mounting device or the rail mounting device.

The rail mounting device preferably has an upper contact element, a lower contact element, and a clamping device. It is especially preferred that the lower contact element is configured to be adjustable in the vertical direction by the adjusting device. The adjusting device makes it possible to adjust the rail mounting device in the vertical direction to the rail thickness of the wall rail or ceiling rail. If the adjusting device of the at least one fastening device makes it possible to adjust the rail mounting device at the same time, the holding device is configured to be more compact and fewer components are required.

In another preferred embodiment, the first fastening device and/or the second fastening device are configured to be rotatable around at least one further axis of rotation relative to the basic frame. The rotatability around a further axis of rotation expands the operative range of the holding device. By rotating the pipe adapters, it is possible to fasten pipes running both vertically as well as horizontally with the same holding device.

Additional advantages and advantageous embodiments of the subject of the invention can be found in the description and the drawings. Similarly, the characteristics cited in the foregoing and those listed below according to the invention can respectively be used individually or multiply in any combination. The embodiments that are shown and described should not be understood as an exhaustive enumeration, rather they have an exemplary character in describing the invention.

DETAILED DESCRIPTION OF THE DRAWINGS

Figure 1:
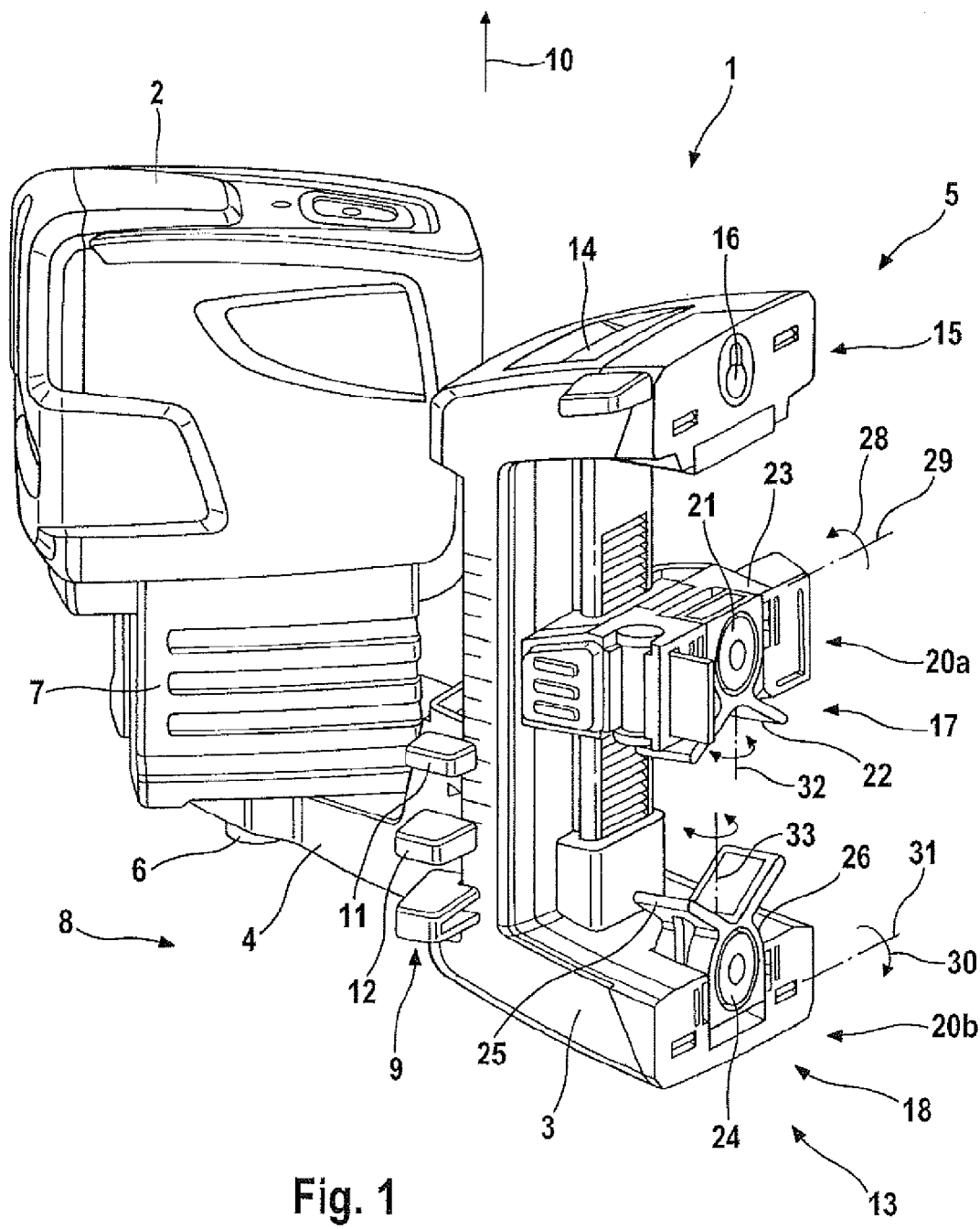
FIG. 1 illustrates a holding device according to the present invention with a magnetic holding element in an active position for fastening the holding device to a magnetic construction and a pipe adapter in a passive position.

The holding device 1 according to the invention depicted in FIG. 1 for fastening a laser instrument 2 to a magnetic construction, a pipe, a wall rail and/or ceiling rail, or a wall, which are summarized in the following as the substrate, is comprised of a U-shaped basic frame 3, a receptacle device 4 connected to the basic frame 3 to accommodate the laser instrument 2 and a fastening apparatus 5 connected to the basic frame 3, which is used to fasten the holding device 1 to the substrate.

The laser instrument 2 is connected to the holding device 1 by the receptacle device 4. To do so, the receptacle device 4 has a thread screw 6, which can be screwed into a corresponding mating thread (not shown) of the laser instrument 2. In the design in FIG. 1, the laser instrument 2 is not directly connected to the receptacle device 4. The laser instrument 2 is arranged on a base 7, which has a mating thread (not shown), into which the thread screw 6 is screwed. The laser instrument 2 can also be connected directly to the receptacle device 4 without the base 7. After the thread screw 6 is loosened, it is possible to adjust the alignment of the laser instrument 2. The receptacle device 4 is attached to a front side 8 of the basic frame 3 and configured to be adjustable along the basic frame 3 via an adjusting device 9. The direction in which the receptacle device 4 is adjustable relative to the basic frame 3 is designated as the vertical direction 10. The adjusting device 9 is comprised of a rough adjustment device 11 and a precision adjustment device 12. The adjusting device 9 can be used to adjust the position of the laser instrument 2 in the vertical direction 10 very precisely without the position of the holding device 1 on the substrate having to be modified.

The holding device 1 has several fastening devices that make it possible to suspend the laser instrument 2 on a concrete wall, a suspended ceiling, a wall rail or ceiling rail, a pipe and a magnetic construction. Provided on the rear side 13 of the basic frame 3 opposing the front side 8 is a wall mounting device 15 on an upper end 14 of the basic frame 3. The wall mounting device 15 has an opening 16 to accommodate a nail, a screw or a similar fastening element, which is attached in a wall. Also arranged on the rear side 13 of the basic frame 3 are a first fastening device 17 and a second fastening device 18.

FIG. 1 shows the holding device 1 according to the invention with the first and second fastening devices 17, 18 in a first position 20a, 20b. The first fastening device 17 is comprised of a magnetic holding element 21 and a first pipe adapter 22, which are arranged on a first basic element 23. The second fastening device 18 is comprised of a second magnetic holding element 24 and a second pipe adapter 25, which are arranged on a second basic element 26. In the first position 20a, 20b, the holding device 1 is fastened to a magnetic wall or other magnetic construction via the magnetic holding elements 21, 24.

The fastening apparatus 5 has two magnetic holding elements 21, 24 and two pipe adapters 22, 25. A single magnetic holding element or a single pipe adapter also makes it possible to fasten the holding device 1 to a magnetic construction or to a pipe. The second magnetic holding element or the second pipe adapter makes a secure fastening possible. The danger that the holding device 1, and therefore the laser instrument 2, will tip over is reduced by the second magnetic holding element or the second pipe adapter.

In order to fasten the holding device 1 by the pipe adapters 22, 25 to a pipe aligned in the vertical direction 10, the first and second fastening devices 17, 18 are adjusted from the first position 20a, 20b into a second position 27a, 27b. To do this, the first fastening device 17 is rotated 90° counterclockwise (arrow 28) around the axis of rotation 29 and the second fastening device 18 is rotated 90° clockwise (arrow 30) around the axis of rotation 31. The first and second fastening devices 17, 18 are configured to be rotatable respectively 180° around the axis of rotation 29, 31, wherein the axes of rotation 29, 31 run perpendicular to the vertical direction 10. The first fastening device 17 is configured to be rotatable from the first position 20a 180° counterclockwise (arrow 28) around the axis of rotation 29 and the second fastening device 18 is configured to be rotatable 180° clockwise (arrow 30) around the axis of rotation 31.

The first and second fastening devices 17, 18 are also configured to be rotatable around a second axis of rotation 32, 33, wherein the second axis of rotation 32, 33 differs from the first axis of rotation 29, 31, in particular it is perpendicular to the first axis of rotation 29, 31. In order to fasten the holding device 1 by the pipe adapters 22, 25 to a pipe that is aligned perpendicularly to the vertical direction 10, the first and second fastening devices 17, 18 are rotated 90° around the respective axis of rotation 32, 33. The first and second fastening devices 17, 18 are configured to be rotatable 360° around the respective axis of rotation 32, 33. The first and second fastening devices 17, 18 can be rotated in an overlapping manner around the first axis of rotation 29, 32 and the second axis of rotation 32, 33.

Figure 2:
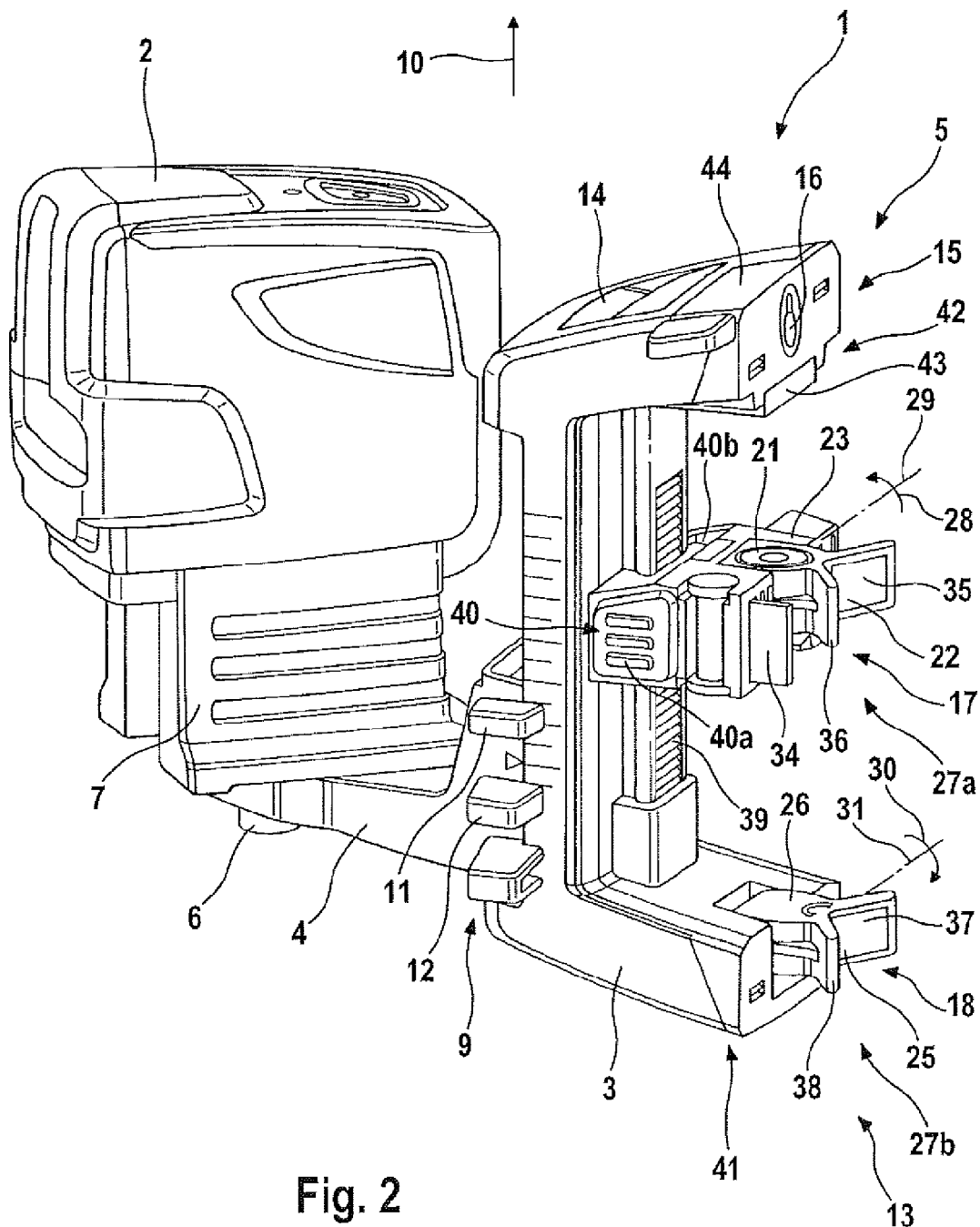
FIG. 2 illustrates the holding device of FIG. 1 with the magnetic holding element in a passive position and the pipe adapter in an active position for fastening the holding device to a pipe.

FIG. 2 shows the holding device 1 according to the invention with the first and second fastening devices 17, 18 in the second position 27a, 27b. In the second position 27a, 27b, the holding device 1 is fastened to a pipe via the pipe adapters 22, 25 and a belt 34, which is arranged on the first basic element 23 of the first fastening device 17. The pipe adapters 22, 25 are comprised of two contact surfaces 35-38 each arranged in a V-shaped manner. The dimensions of the contact surfaces 35-38 and the angle between the contact surfaces 35, 36 or 37, 38 are dimensioned in such a way that the pipe adapters 22, 25 make fastening possible to typical pipes in interior work, such as, for example, sewage pipes or clamping bars. In order to adapt the pipe adapters 22, 25 to different pipe cross sections and pipe diameters, the contact surfaces 35-38 can be configured to be adjustable. Adjusting devices (not shown) are used to adapt the angle between the contact surfaces 35-38 to the pipe cross section and the pipe diameter.

The first fastening device 17 is configured to be height adjustable. For this purpose, the first basic element 23 is arranged on a gear rack 39 and provided with an adjusting device 40. The adjusting device 40 has a rough adjustment device 40a and a precision adjustment device 40b. The rough adjustment device 40a is used to position the first fastening device 17 in an approximate manner in the vertical direction 10 relative to the basic frame 3. The precision adjustment device 40b is used to adapt the position of the first fastening device 17 very precisely in the vertical direction 10.

The second fastening device 18 is arranged on a lower end 41 of the basic frame 3 and firmly connected to the basic frame 3. The distance between the first and second fastening devices 17, 18 is modified via the height, i.e., the position of the first fastening device 17 in the vertical direction 10. Alternatively, the second fastening device 18 can also be configured to be adjustable in the vertical direction 10 and be provided with an adjusting device, which engages in the gear rack 39. An adjustable, second fastening device 18 is advantageous, if not only the distance in the vertical direction 10 between the first and second fastening devices 17, 18 is supposed to be adjusted, but also the position of the fastening devices 17, 18 with respect to the laser instrument 2.

In addition to the wall mounting device 15 and the first and second fastening devices 17, 18, a fourth fastening device 42 in the form of a rail mounting device is provided on the rear side 13 of the basic frame 3. The rail mounting device 42 is comprised of an elastically configured upper contact element 43 and a clamping device 44 in the form of an eccentric. The first basic element 23 serves as the lower contact element for a rail and therefore as a counter bearing for the upper contact element 43. The adjusting device 40 of the first basic element 23 is used to adjust the distance between the upper contact element 43 and the first basic element 23 to the rail thickness. By actuating the clamping device 44, the rail is clamped between the upper contact element 43 and the first basic element 23.

The first basic element 23 is configured in such a way that the holding device 1 can also be fastened to a wall rail or a suspended ceiling rail in the second position 27a of the first basic element 23. In the second position 27a, the pipe adapter 22 increases the distance of the fastening device 5 from the rear side of the rail. The disadvantage of this, however, is that, in the case of rails having a short depth, the contact surface between the lower contact element and the rail is very small. On the other hand, the first magnetic holding element 21, which belongs in the second position 27a to the lower contact element of the rail mounting device 42, can strengthen the fastening in the case of magnetic rails.

The holding device 1 can also be fastened to a rail by the first and second basic elements 23, 26. In this case, the first basic element 23 serves as the upper contact element and the second basic element 26 as the lower contact element. Serving as contact elements for the rail are the magnetic holding elements 21, 24, elastically configured pipe adapters 22, 25 or a magnetic holding element and a pipe adapter. Alternatively, the basic elements on the sides of the basic elements 23, 26 opposite from the magnetic elements comprise contact elements for the rail. The adjusting device 40 of the first basic element 23 serves as the clamping device, which is actuated until the rail is clamped securely between the basic elements 23, 26.

The first and second fastening devices 17, 18 are configured to be adjustable into a third position via rotation around the respective axis of rotation 29, 31. The surfaces of the basic elements 23, 26 opposite from the magnetic holding elements 21, 24 can comprise wall mounting devices or other fastening devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A holding device for fastening a laser instrument, comprising:
   a frame;
   a receptacle device connected to the frame; and
   a fastening apparatus connected to the frame, wherein the fastening apparatus has a first fastening device that is rotatable around a first axis of rotation relative to the frame from a first position into a second position;
   wherein the first fastening device has a magnetic holding element and a pipe adapter, wherein the frame is fastenable to a substrate via the magnetic holding element when the first fastening device is in the first position and wherein the frame is fastenable to a substrate via the pipe adapter when the first fastening device is in the second position.

2. The holding device according to claim 1, wherein the fastening apparatus has a second fastening device connected to the frame, wherein the second fastening device is rotatable around a second axis of rotation relative to the frame from a first position into a second position.

3. The holding device according to claim 2, wherein the first fastening device and/or the second fastening device are/is rotatable around the respective axis of rotation relative to the frame from the respective first position or the second position into a third position.

4. The holding device according to claim 2, wherein the first fastening device and/or the second fastening device are adjustable in a vertical direction relative to the frame by an adjusting device.

5. The holding device according to claim 2, wherein the first fastening device and/or the second fastening device have a wall mounting device and/or a rail mounting device.

6. The holding device according to claim 5, wherein the first fastening device and/or the second fastening device are rotatable around the respective axis of rotation relative to the frame from the respective first position or the second position into a third position and wherein the frame is fastenable to a substrate via the wall mounting device or the rail mounting device when the first fastening device and/or the second fastening device are/is in the respective third position.

7. The holding device according to claim 5, wherein the rail mounting device has an upper contact element, a lower contact element, and a clamping device.

8. The holding device according to claim 7, wherein the lower contact element is adjustable in a vertical direction relative to the frame by an adjusting device.

9. The holding device according to claim 2, wherein the first fastening device and/or the second fastening device are rotatable around an additional axis of rotation relative to the frame.

10. A holding device for fastening a laser instrument to a first and a second substrate from a group of substrates including a magnetic construction, a pipe, a wall rail, a ceiling rail, and a wall, comprising:
a frame;
a receptacle device connected to the frame; and
a fastening apparatus connected to the frame, wherein the fastening apparatus has a fastening device that is rotatable around an axis of rotation relative to the frame from a first position into a second position, wherein the frame is fastenable to the first substrate via the fastening device when the fastening device is in the first position and is fastenable to the second substrate via the fastening device when the fastening device is in the second position, and wherein the fastening device is adjustable in a vertical direction relative to the frame by an adjusting device.

11. A holding device for fastening a laser instrument to a rail and to a first and a second substrate from a group of substrates including a magnetic construction, a pipe, and a wall, comprising:
a frame;
a receptacle device connected to the frame;
a fastening apparatus connected to the frame, wherein the fastening apparatus has a fastening device that is rotatable around an axis of rotation relative to the frame from a first position into a second position, wherein the frame is fastenable to the first substrate via the fastening device when the fastening device is in the first position and is fastenable to the second substrate via the fastening device when the fastening device is in the second position; and
a rail mounting device for fastening the laser instrument to the rail including an upper contact element, a lower contact element, and a clamping device, wherein the lower contact element is adjustable in a vertical direction relative to the frame by an adjusting device.

12. A holding device for fastening a laser instrument to a first and a second substrate from a group of substrates including a magnetic construction, a pipe, a wall rail, a ceiling rail, and a wall, comprising:
a frame;
a receptacle device connected to the frame; and
a fastening apparatus connected to the frame, wherein the fastening apparatus has a fastening device that is rotatable around an axis of rotation relative to the frame from a first position into a second position, wherein the frame is fastenable to the first substrate via the fastening device when the fastening device is in the first position and is fastenable to the second substrate via the fastening device when the fastening device is in the second position, and wherein the fastening device is rotatable around an additional axis of rotation relative to the frame.

* * * * *